United States Patent [19]

Carobolante et al.

[11] Patent Number: 5,017,845
[45] Date of Patent: May 21, 1991

[54] BRUSHLESS DIRECT CURRENT MOTOR STARTING AND OPERATING APPARATUS AND METHOD

[75] Inventors: Francesco Carobolante; Ermanno Pace; Mark McCormack, all of Phoenix, Ariz.

[73] Assignee: SGS-Thomson Microelectronics, Inc., Carrollton, Tex.

[21] Appl. No.: 593,002

[22] Filed: Oct. 5, 1990

[51] Int. Cl.⁵ .............................................. H02P 6/02
[52] U.S. Cl. .................................... 318/138; 318/254; 318/778
[58] Field of Search .............................. 318/720–723, 318/138, 254, 778

[56] References Cited

U.S. PATENT DOCUMENTS

| | | | |
|---|---|---|---|
| 3,909,688 | 9/1975 | Blaschke | 318/702 |
| 4,631,459 | 12/1986 | Fujioka et al. | 318/254 |
| 4,743,815 | 5/1988 | Gee et al. | 318/254 |
| 4,746,850 | 5/1988 | Abbondanti | 318/778 |
| 4,912,378 | 3/1990 | Vukosavic | 318/254 |

Primary Examiner—David Smith, Jr.
Attorney, Agent, or Firm—Ronald S. Lombard; Richard K. Robinson

[57] ABSTRACT

A starting and operating apparatus and method for a sensorless, brushless direct current motor is disclosed. During start-up, the excitation to the motor is turned off while the slope of the differential back electromotive force of the floating phases is sampled. This indicates when the proper rotation and torque of the motor is obtained. After starting the motor, the apparatus samples the slope of the back electromotive force of the floating coils and finds a zero or predetermined slope condition which has been found to be near the optimum switching point for commutation from one phase to the next. A masking circuit is included to prevent an unwanted commutation immediately after commutating to the next phase.

22 Claims, 7 Drawing Sheets

BRUSHLESS DIRECT CURRENT MOTOR STARTING AND OPERATING APPARATUS AND METHOD

BACKGROUND OF THE INVENTION

The present invention relates to an apparatus and method for starting and operating a brushless direct current motor, and in particular, starting and operating a brushless direct current motor without the use of add-on sensors. Brushless direct current motors are used in applications such as for disk drives and video cassette recorders and are typically under stringent requirements regarding their performance in these applications. Disk drive manufacturers are concerned with the possibility of having a backward rotation of the motor which may cause warpage of the read-write heads since they are often laying on the disk when it rests. This invention is directed to starting such a motor. Another requirement of users of these motors is that the torque of the motor is optimized once the correct direction of rotation during start-up is achieved. Failure to maximize the torque may cause losing control of the motor, ripple on the speed or loss of efficiency, which is not acceptable for applications, such as, portable, battery-operated systems.

The use of sensors such as Hall-sensors to detect the rotation of the motor, for example, as known in the art, often results in diminished performance of the motor with the offset of the Hall-sensor and errors due to the positioning of the Hall-sensor inside the motor.

Motor driving circuits utilizing the back-electromotive force sensing principle give an alternative to the use of sensors for motor driving circuits.

One such motor driving circuit based on the back-electromotive force sensing principle is disclosed in an article entitled "A Full-Wave Motor Drive IC Based on the Back-EMF Sensing Principle", by J. P. M. Bahlmann, IEEE Transactions on Consumer Electronics, Vol. 35, No. 3, Aug. 1989, pp. 415–420. The Bahlmann full-wave motor drive utilizes a bipolar integrated circuit which has been designed to allow full-wave driving of brushless three-phase DC motors. Three push-pull power stages are operated in a switching mode. The commutation moments are derived from the zero-crossings of the sensed back-electromotive force in the floating motor windings. A start-up system is also disclosed which generates commutations when no zero-crossing can be detected. Problems may occur, though in utilizing zero-crossing of the floating phase due to common mode signals especially during starting of the motor.

SUMMARY OF THE INVENTION invention overcomes the difficulties of the prior art by providing the hereinafter described improvement in combination with a sensorless, brushless direct current motor. As is well known in the art, such a motor typically includes a permanent magnet rotor and a stator having multiple phases. An excitation means is included for sequentially in a plurality of predetermined commutations exciting simultaneously a predetermined number of the multiple phases while maintaining the remainder of the multiple phases in a non-excited state such that during each of the commutations of the sequential excitation of the multiple phases, the simultaneously excited phases constitute an excited phase group and the remainder of the multiple phases constitute a non-excited phase group. The brushless direct current motor and excitation system described thus far is well known in the art. Typically, the stator of such a motor consists of three phases and is usually connected in a star or Y-configuration. The excitation means is generally unipolar where the excited phase group consists of one of three phases; the non-excited phase group consists of the remaining two of the three phases; or bipolar excitation where the excited phase group consists of two of the three phases and the non-exited phase group consists of the remaining one of the three phases.

The improvement of the present invention includes means for turning off the excitation to the excited phase group at a predetermined time during start-up of the motor for a predetermined off-time period such that none of the multiple phases are excited during the off-time period.

Means for detecting the differential back-electromotive force developed in the non-excited phase group during the predetermined off-time period is provided. Also, means for sampling the magnitude and sign of the slope of the detected back-electromotive force of the non-excited phase group for a predetermined sample period during the off-time period is provided, whereby the direction of rotation and torque on the rotor may be determined.

Preferably, the predetermined sample period begins after a predetermined delay period. The delay period starts at the beginning of the off-time period, whereby noise from unwanted signals generated during start-up are diminished before the sampling period is started.

Another aspect of the invention is directed towards operating the motor once the correct direction of rotation of the rotor is obtained. The improvement comprises means for detecting the differential back-electromotive force in the non-excited phase group. Means for sampling the magnitude of the slope of the detected back-electromotive force of the non-excited phase group and for generating a signal representative of the magnitude of the slope is also provided. Means is provided for causing the excitation means to increment to the next commutation in the plurality of predetermined sequences upon the magnitude of the sample slope reaching a predetermined value represented by the generated signal, whereby the maximum torque from each phase of the motor is utilized.

Preferably, the improvement further comprises means for masking the generated signal for a predetermined masking time, upon the excitation means incrementing to the next commutation, whereby the excitation means is prevented from incrementing for a predetermined time after switching to the next commutation.

A method for practicing the invention is also disclosed.

BRIEF DESCRIPTION OF THE DRAWINGS

For a better understanding of the invention, reference may be had to the accompanying drawings exemplary of the invention in which.

BRIEF DESCRIPTION OF THE PREFERRED EMBODIMENTS

Figure 1:
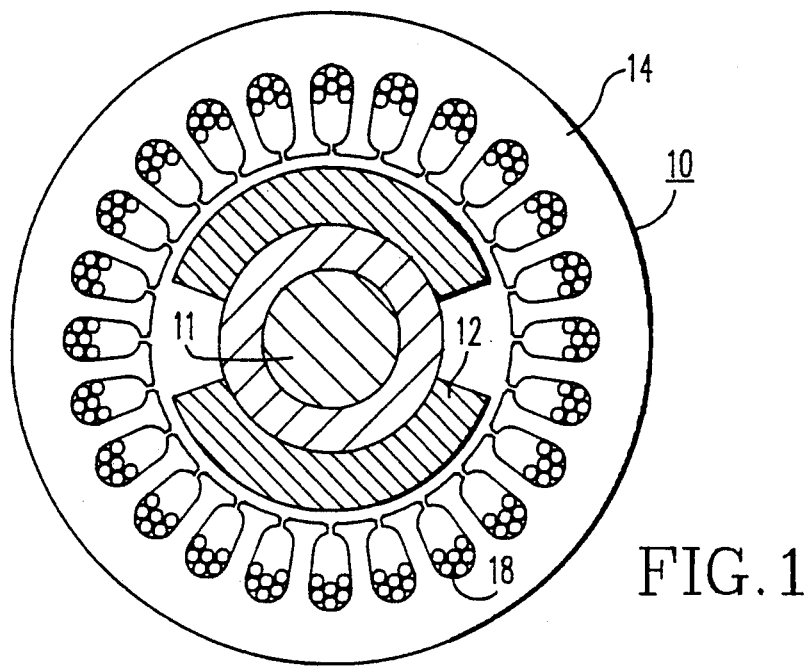
FIG. 1 is a cross-sectional elevational view of a typical brushless direct current motor.
Figure 2:
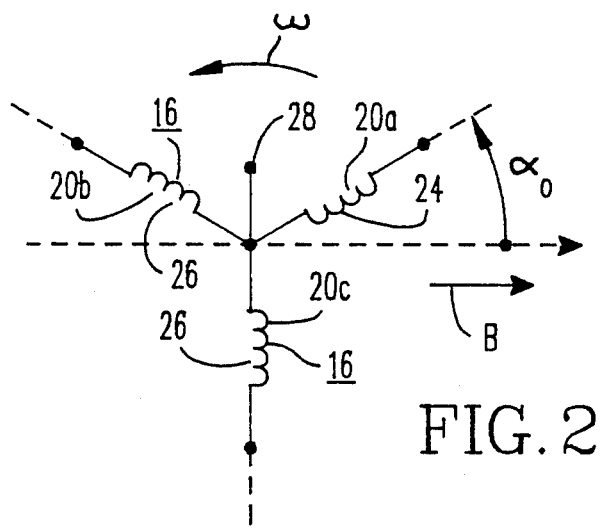
FIG. 2 is a schematic diagram of a typical three-phase direct current brushless motor showing the phase arrangement relative the magnetic field "B" for a Y-configuration.
Figure 7:
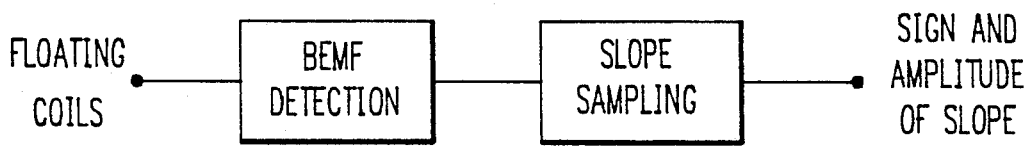
FIG. 7 is a block diagram of the invention for start-up.

In FIG. 1 there is shown a cross-sectional elevational view of a typical brushless direct current motor 10. The motor includes a permanent magnet rotor 12 and a stator 14 having multiple phases 16 as shown in FIG. 2. The multiple phases 16 are comprised of a plurality of coils 18 shown in FIG. 1. As stated before, such a motor may be used for disk drive and video cassette recorder application, for example. The motor 10 shown in FIG. 2 has the rotor 12 housed within stator 14. Very often for such applications the stator 14 may be housed within rotor 12. The present invention is applicable to either construction. Generally, these motors consist of three phases 20a, 20b and 20c, for example, connected in a Y-configuration as shown in FIG. 2. An example of such motor is one manufactured by Nidec, Model No. 2527-42FX-01.

An excitation means 22, including exciter 21 and sequencer 23 is normally provided for sequentially in a plurality of predetermined commutations, exciting simultaneously a predetermined number of the multiple phases 16 while maintaining the remainder of the multiple phases in a non-excited state. This is done so that the during each of the commutations of sequential excitation of the multiple phases 16, the simultaneously excited phases constitute one excited phase group 24 and the remainder of the multiple phases 16 constitute a non-excited phase group 26. For example, in FIG. 2, for the case of unipolar excitation where the excited phase group 24 consists of exciting one of the three phases at a time, such as, phase 20a, while the non-excited phase group consists of the remaining two of the three phases 20b 20c; at the next commutation phase 20b may be the excited phase group 24 and phases 20a and 20c would constitute the non-excited phase group 22, and so on. In bipolar excitation, the excited phase group 24 consists of two of the three phases being excited 20a, 20b while the nonexcited phase group consists of the remaining one phase 20c, until the following commutation takes place. These excitation schemes are not shown in the drawings, but are well known in the art. The excitation means 22 including sequencer 21 and exciter 23 is well known in the art. The sequencer 21 and exciter 23 can be ones such as hereinafter listed table of components.

One aspect of the improvement of the present invention is directed towards start-up of the motor 10. As stated previously, it is critical to determine for such motors and disk drive applications for example, the initial direction of rotation of the rotor upon energization. This aspect of the present invention is based on detecting the back electromotive force of the floating phase or phases. The present invention is a system and method which requires no position sensors on the motor 10 to determine the initial direction of rotation during start up. The other aspect of the invention provides the correct timing for the commutation sequence of the phases, once the motor starts in the correct direction of rotation.

In a three phase brushless motor, the stator coils 18 which make up the phases 20a, 20b and 20c shown in FIG. 2 are typically wound in a star or Y configuration at an angle of 120° electrical with respect to each other. The back electromotive force on each phase is considered with respect to the center tap 28. In the steady state operating condition, $\omega$, is equal to a constant which is the angular velocity of the rotating field for steady state operation. The following are some formulas from the electrical motors theory.

Figure 4:
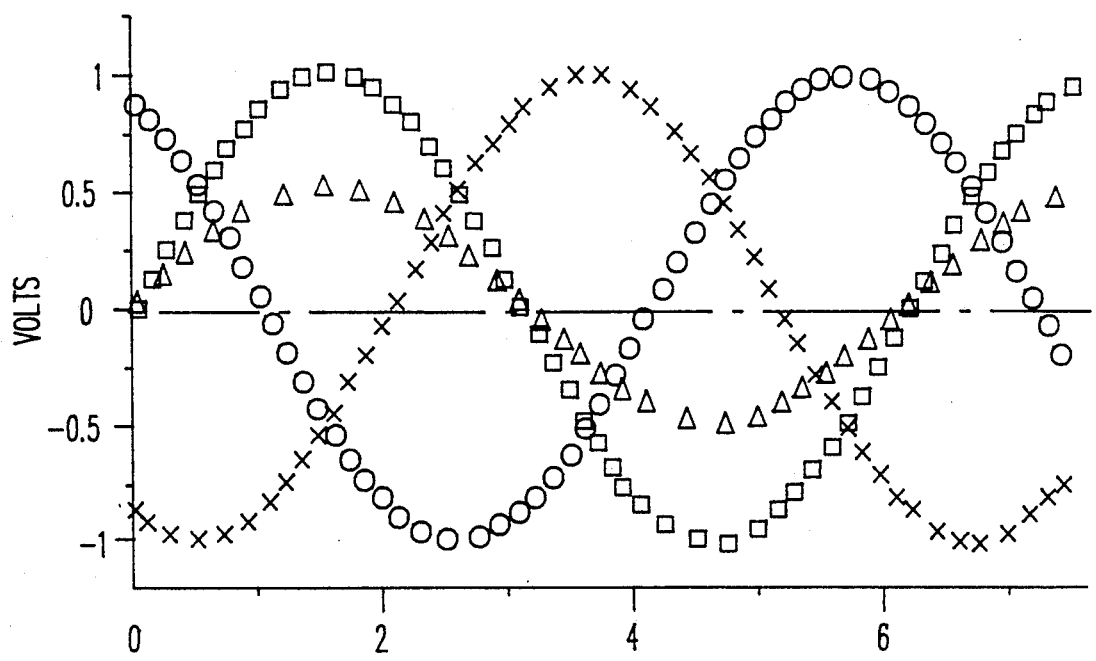
FIG. 4 is a plot of back-electromotive force waveforms in a three-phase brushless direct current motor during operation, also showing the torque on phase A.

FORMULAS n = number of turns in the coils
S = surface area enclosed by a turn of the windings
T = torque
J = moment of inertis of the motor
$\omega$ = angular velocity
$T_i$ = torque generated by phase i
$l_i$ = current flowing in phase i
$\alpha_i$ = angle of coil i w. r. t. magnetic field B
$\alpha_o = \alpha_A$ at t = 0
$T = J\dot\omega$
$\phi_i = B\ S\ \cos(\alpha_i)$ = electromagnetic flux in coil i (i = A,B,C)
$T_i = \vec{B} \wedge \vec{H} = B\ n\ li\ \sin(\alpha_i) = K_T\ li\ \sin(\alpha_i)$
$V_i = BEMFi = -n(\partial\phi i/\partial t) = n\ S\ B\ \sin(\alpha_i)\ \dot\alpha_i = Ke\ \sin(\alpha_i)\ \dot\alpha_i$
$K_T$ = mechanical constant of the motor
$K_e$ = electrical constant of the motor The steady state operating condition of the motor 10 is depicted in FIG. 4 for a given phase 20a energized with a constant current I. A negative torque on phase 20a means that the torque opposes the direction of rotation of the rotor 12. The torque provided by phase 20a is in phase with its own back electromotive force. In FIG. 4, the squares represent the back electromotive force on phase 20a, the x's represent the back electromotive force on phase 20c and the circles represent the back electromotive force on phase 20b. The triangles represent the torque provided by phase 20a which as can be seen in FIG. 4 is in phase with its own back electromotive force. In FIG. 4 torque is shown for phase relationship only; units of torque are not shown. The present invention, is concerned with an analysis of the behavior of the back electromotive force upon the floating phases 20b and 20c when phase 20a is energized which would be a unipolar energization but the analysis would likewise hold true for bipolar energization. From the foregoing formulas the following relationships may be obtained.

$$V_A = -n\ (\partial\phi_A/\partial t)|\omega = \omega_o = K_e\ \omega_o \sin\ (\alpha_o + \omega_o t)$$

$$V_B = -n\ (\partial\phi_B/\partial t)|\omega = \omega_o = K_e\ \omega_o \sin\ (\alpha_o + 2\pi/3 + \omega_o t)$$

$$V_C = -n\ (\partial\phi_C/\partial t)|\omega = \omega_o = Ke\ \omega_o \sin\ (\alpha_o - 2\pi/3 + \omega_o t)$$

Taking the sum and difference of $V_B$ and $V_C$ one obtains:

$$V_B + V_C = -K_e\ \omega_o \sin\ (\alpha_o + \omega_o t) = -V_A$$

$$V_B + V_C = K_e \omega_o \sqrt{3} \cos\ (\alpha_o + \omega_o t) = \sqrt{3}\ (\partial V_A/\partial t)$$

Figure 3:
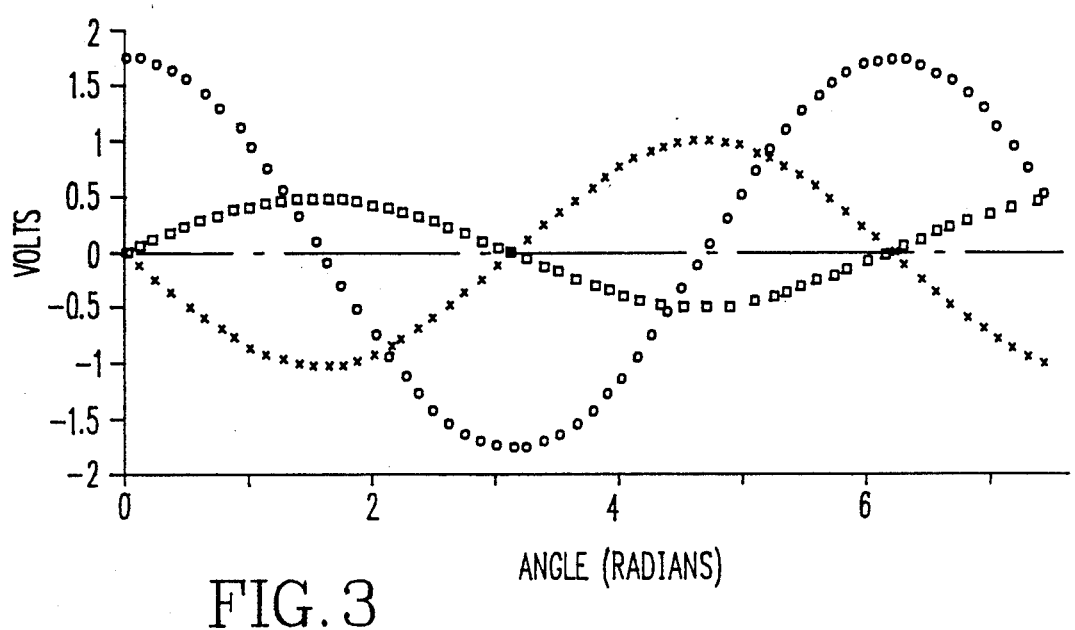
FIG. 3 is a plot of the sum and difference wave forms of the back-electromotive force of the nonexcited phase in group in unipolar excitation and also showing the torque on the single excited phase.

These relationships are shown in FIG. 3 where the squares indicate the torque on phase 20a. Torque is shown in FIG. 3 for phase relationship only; units of torque are not shown. The circles indicate the differential back electromotive force $V_B - V_C$. The x's indicate the sum of the back electromotive force on phases 20b and 20c, $V_B + V_C$. As can be seen from FIG. 3 the differential voltage across phases 20b and 20c is 90° the out of phase with torque function of phase 20a. During start up, information on the torque provided by a given phase for example 20a, when it is energized is important in determining whether the energization results in the motor rotating in the correct direction. This is equivalent to determining in which half plane the energized phase lies with respect to the magnetic field vector B shown in FIG. 2. In principal, the sign of $V_B + V_C$ provides the information on the sign of the torque, but unfortunatly any common mode signal will affect the reading especially at low speed start-up where the back electromotive force signal is proportional to the rotational velocity during start-up. The common mode signals are typically much larger than the back electromotive force that is being attempted to be detected due to current flowing through the winding. Referring to FIG. 3, it can be seen that the slope of the back electromotive force of $V_B - V_C$ provides the same information and is more easily detected, independently of DC offsets. It has been found that the sign of the slope of the differential back electromotive force of the floating phases provides information as to the direction of rotation of the motor during start-up and the magnitude of the slope of $V_B - V_C$ is maximum in the region of maximum torque of phase 20a. Mathematically it can be expressed as $$\partial(V_B - V_C)/\partial t = \partial(V_B - V_C)\ \partial\alpha\dot\alpha = -K_e\ \omega_o^2 \sqrt{3} \sin\ (\alpha_o + \omega_o t)$$

From this, it can be seen that the sign of the slope is opposite to the sign of $\sin\alpha_o$, which is the same as the torque's. During start up though the speed is all but constant. For a very small movement from the original position of the rotor 12, it can be assumed that the speed is linear function of time, provided the motor is energized with constant current. In fact, if phase 20a is energized for example at time $t=0$, the current will rise with the time constant which depends on the self-inductance of the motor, and is assumed to be small compared to the observation time. The following relationships are obtained at time $t=0+$.

$$T\ (t=0+) = Km\ I\ \sin\ (\alpha_o)$$

$$\dot\omega = T/J = Km\ I\ \sin\ (\alpha_o)/J$$

$$\omega(t)|t=o^+ = (Km\ \sin\ [\alpha_o]/J)\ t = R_o t\ \text{where}\ R_o = f\ (\alpha_o)$$

The slope of $V_B - V_C$ is calculated by taking its derivative.

$$V_B - V_C = Ke\omega \sqrt{3} \cos(\alpha_o + \omega t)$$

$$\begin{aligned}\partial(V_B - V_C)/\partial t &= \partial(V_B - V_C)/\partial\alpha\dot\alpha + \partial(V_B - V_C)/\partial\omega\dot\omega \\ &= -K_e\ \omega^2 \sqrt{3}\ \sin(\alpha) + Ke\ \dot\omega \sqrt{3}\ \cos(\alpha) \\ &= -K_e\ R_o^2 t^2 \sqrt{3}\ \sin(\alpha_o + R_o t^2) + \\ &\quad K_e R_o \sqrt{3}\ \cos(\alpha_o + R_o t^2)\end{aligned}$$

For t small, it can be assumed that the distance travelled is small and, therefore, $$\alpha_o + R_o t^2 \approx \alpha_o$$

which is also the limit of validity of the analysis. Since a constant torque was assumed, therefore:

$$SLOPE = -K_e R_o^2 t^2 \sqrt{3}\ \sin\ (\alpha_o) + K_e R_o\ \sqrt{3}\ \cos\ (\alpha_o).$$

The first term in this relationship is the $\sin\alpha_0$ factor which is the term of interest. The second part of the foregoing equation contributes an error which distorts the analysis. In particular, this error is 90° out of phase so that correct detection is given in two quadrants and an erroneous one is given in the other two quadrants. This is true for signals being detected at a time which is close to the origin. As the first term is multiplied by the factor $t^2$ and, therefore, dominates thereafter. As hereinafter described, the present invention overcomes this problem by providing an initial high current pulse so that the motor starts moving then an analysis of the signal is made after turn off of the initial current. By doing this, the first term of the equation dominates over the second term which is an acceleration term $d\omega/dt$. In other words, by turning the current pulse off, the acceleration term tends to 0 and the first term dominates the equation and detection is greatly improved.

In the foregoing analysis, it has been assumed that the current flowing is through only one phase 20a, for example, which requires the driving of the center tap 28. The differential back electromotive force sensing across the floating phases, for example, phase 20b and phase 20c provides an excellent rejection to the large common mode signals which are present due to one phase being driven through the center tap 28, conversely, for bipolar driving, equally good common mode rejection is achieved by sensing the back electromotive force across phase 20a after energizing phases 20b and 20c.

Figure 6:
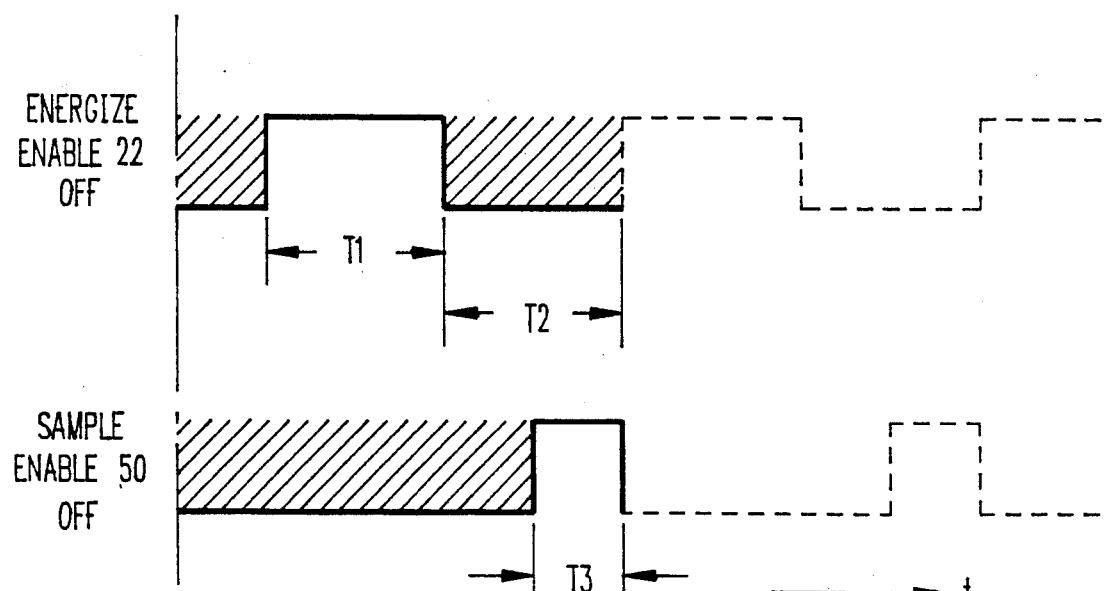
FIG. 6 shows the on-time and off-time period for the means for turning off the excitation to the excited phase group in relation to the sample period for the means for sampling the magnitude and sign of the slope of the detected back-electromotive force of the nonexcited phase group during start-up of the motor.

The method of this aspect of the present invention with regard to start-up of the motor 10 involves first turning off the excitations to the excited phase group 24 shown in FIG. 2, i.e., phase 20a; so that none of the phases are excited during the off-time period T2 shown in FIG. 6. The off-time period T2 may be 3.5 milliseconds for example and the on-time period T1 for the initial current pulse time period may be 20 milliseconds, for example. The differential back electromotive force developed in the two non-excited phases, phase 20b and 20c in FIG. 2 is detected during the predetermined off-time period. The magnitude and sign of the slope of the detected differential back electromotive force is then sampled for a predetermined sample time period T3 shown in FIG. 6 during said off time period T2. Sampler period T3 may be 1.5 milliseconds, for example. Preferably the sample period T3 begins after a predetermined delay period such as 2.0 milliseconds. The delay period starts at the beginning of the off-time period T2 thereby providing time for noise from unwanted signals generated during turn-off to diminish before the sampling period is begun.

The improvement with regard to this aspect of the invention relating to start-up of the motor includes means 30 for turning off the excitation to the excited phase group 24 at a predetermined time which is at the end of the time period T1, shown in FIG. 6, during start-up of the motor for the predetermined off-time period T2. None of the multiple phases 16 are excited during the off-time period T2 as previously mentioned. The means 30 may be a clock having an input to the excitation means 22 shown in FIG. 5 with an on time period T1 and an off-this time period T2. The clock 30 is connected to the enable input 31 of the exciter 23. Means 32 for detecting the differential back electromotive force involved in the non-excited phase group 26 during the predetermined off-time period T2 is provided.

Figure 5:
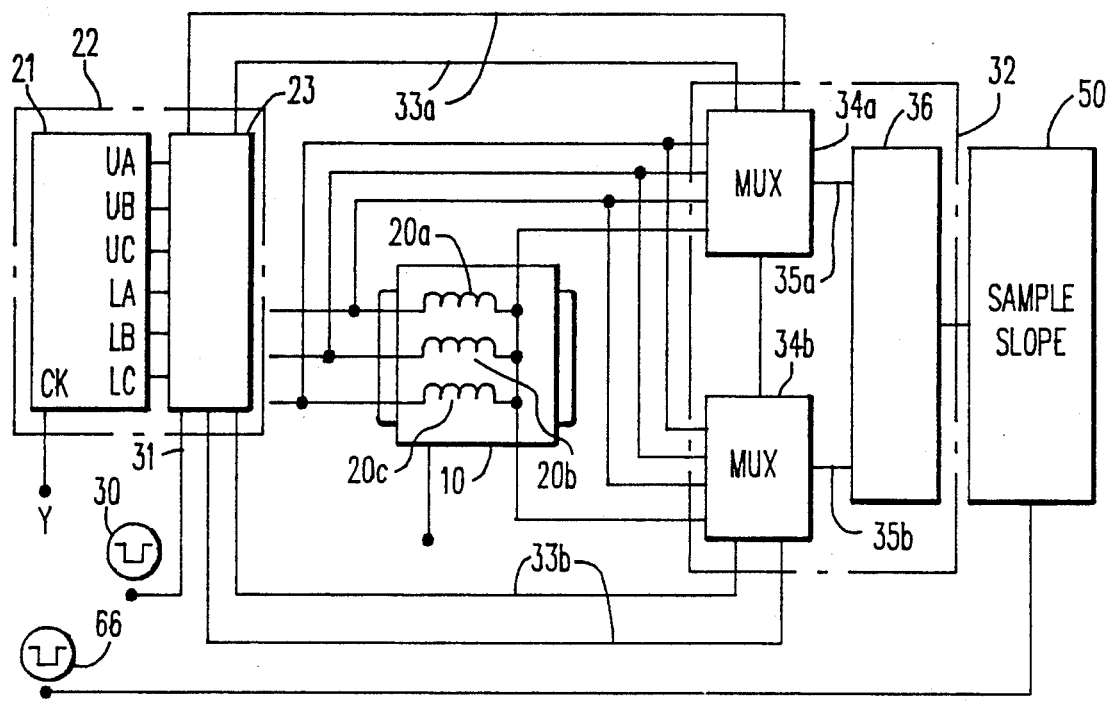
FIG. 5 shows an illustrative embodiment of the present invention for determining the torque and rotation of the rotor during start-up.

The detection means 32 includes multiplexers 34a, 34b for example. The multiplexers 34a, 34b may be CMOS 4000 Series, for example, such as manufactured by SGS-Thompson Microelectronics, the assignee herein, model No. HCC4052B. Referring to FIG. 5, each multiplexer 34a, 34b is connected in circuit with the three phases 20a, 20b, 20c and the center tap of the motor 10. Decode lines 33a and 33b each select one of four input signals. The output of the multiplexer 34a as indicated is 35a and is the back electromotive force of one of the floating phases or the center tap 28, likewise the output of multiplexer 34b as indicated in FIG. 5 is 35b and is the back electromotive force of the other floating phase or the center tap 28.

Figure 8:
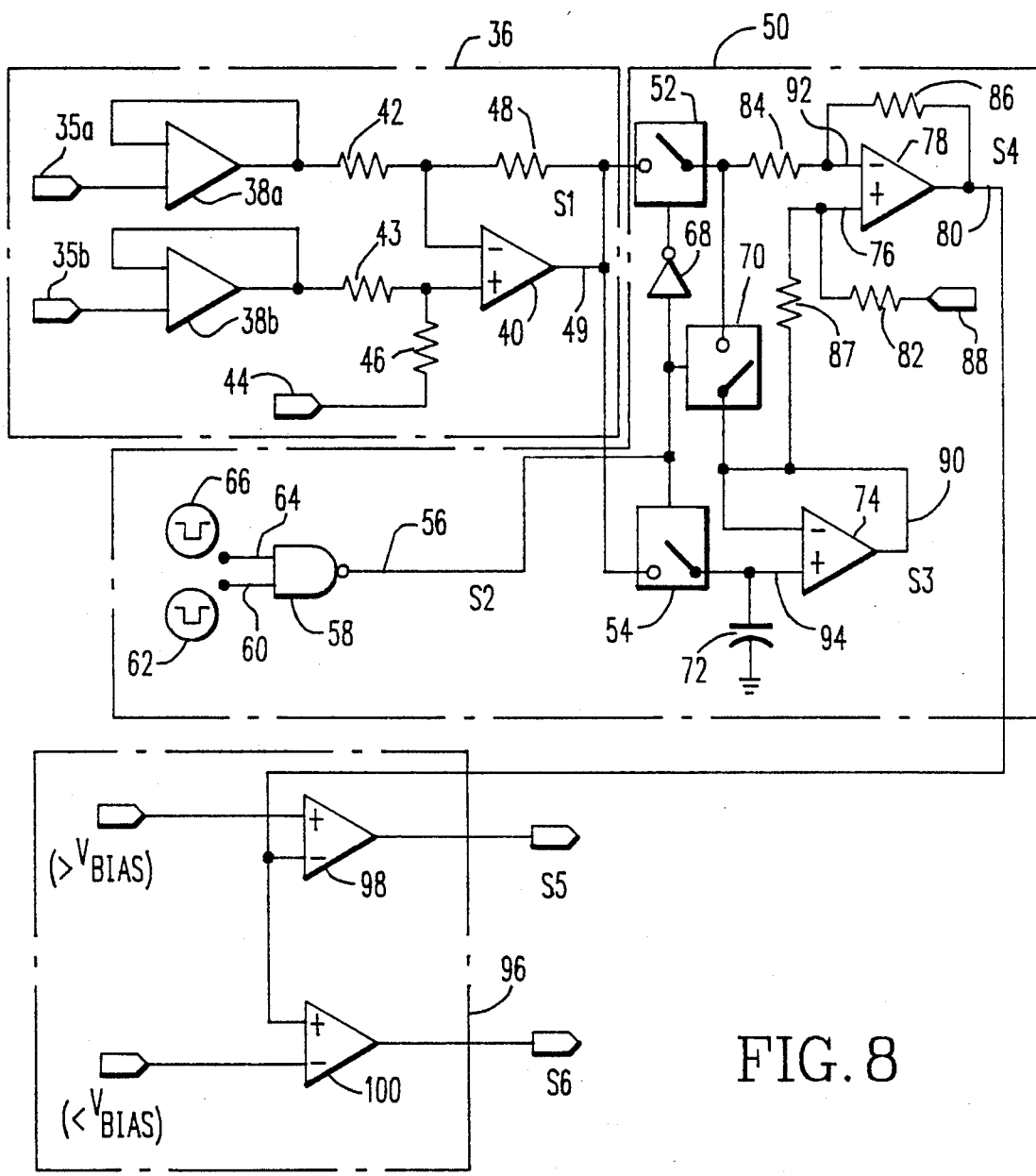
FIG. 8 is a schematic diagram of the detection and sampling means.

The second portion of the detection means 32 is the differential back electromotive force detection circuit 36 shown in FIGS. 5 and 8. The outputs 35a, 35b of the multiplexers 34a, 34b act as the input to the detection circuit. Of course in the embodiment as shown being unipolar, two inputs are required, whereas, in the case of bipolar excitation, only a single floating phase is detected. Referring to FIG. 8, output 35a feeds unity gaining buffer amplifier 38a and output 35b feeds unity gaining buffer amplifier 38b. The purpose of the unity gaining buffer amplifiers 38a, 38b is to avoid loading the motor 10 by differential amplifier 40 and associated components 42, 43, 46 and 48. Differential amplifier 40 receives the output from unity gain buffer 38a through resistor 42 and the output of buffer 38b through resistor 43 and the bias voltage 44 through resistor 46. Resistors 42, 43 and 46 together with resistor 48 and amplifier 40 provide the differential back electromotive force across the floating phases 20b, 20c assuming 20a is energized at the output 49 of amplifier 40. Bias voltage 44 is an intermediate voltage within the supply of the electronics. As an example, a 12 volt supply would have an intermediate voltage of 6 volts.

The improvement of the present invention further comprises means 50 for sampling the magnitude and sign of the slope of the detected differential back electromotive force for the non-excited phase group 26 for the previously described sample period T3. Referring to FIG. 8, output 49 of the amplifier 40 is connected in circuit with the switches 52 and 54. The output 49 is an AC signal and is proportional to the differential back electromotive force that is taken from the floating phases. The signal is referenced to nominally the midpoint of the supply or any other reference ground. Switches 52 and 54 are driven by the output 56 of NAND gate 58 which has as one input 60 a sample enable clock 62 previously described, and at the other input 64 sample and hold clock 66 timed at 2 Kilohertz, 50% duty cycle, for example. Thus, assuming that the cycle is within cycle period T3, the sample and hold clock 66 will drive switches 52, 54 alternately, when one is on and the other is off by placing NOT gate 68 in circuit with switches 52 and 54 as shown in FIG. 8. So that, if we are in sample period T3, during the first phase of the sample and hold technique switch 54 is closed and switch 52 is open and switch 70 is closed. In this configuration the output of amplifier 40 is transferred through switch 54 to capacitor 72. The capacitor 72 is therefore charged to the output voltage of amplifier 40. Amplifier 74 is a voltage follower or buffer and is used to avoid loading the voltage on the capacitor through switch 70 and input 76 of the amplifier 78. Amplifier 78 is connected as a differential amplifier and when switch 70 connects both the inverting and non-inverting inputs there is effectively a zero differential input to amplifier 78 during this phase of the sample and hold clock 66, therefore, the output 80 of the amplifier 78 will maintain itself at the reference voltage. Resistors 82, 84, 86 and 87 are the differential gain resistors, serve the same function as resistors 42, 43, 46 and 48 described previously with respect to amplifier 40.

Voltage reference 88 provides the reference voltage in the output 80 of the amplifier 78. Output voltage 80 is equal to the reference voltage 88 plus the differential signal between outputs 90 and 71 and then multiplied by the ratio of the value of the resistor 86 divided by the value of the resistor 84, for example. If the differential voltage is 0, only the reference voltage will appear at output 80. When the sample and hold clock 62 cycles to the other state, switches 54 and 70 are now open and switch 52 is closed. The capacitor 74 is disconnected from the output 49 of the amplifier 40. The capacitor remains charged at the voltage which was present when the switch 54 was open. Therefore, the buffer amplifier 74 buffers the voltage and has at its output 90 the same voltage which is present on the capacitor 72. The switch 52 now being closed transfers the output 49 of amplifier 40 to the negative input 92 of the differential amplifier 78. The switch 70 is open and therefore the differential amplifier 78 has a differential signal which is across its inputs. The positive input 90 of amplifier 78 sees the voltage which is present on the capacitor 72 through buffer amplifier 74.

Figure 9:
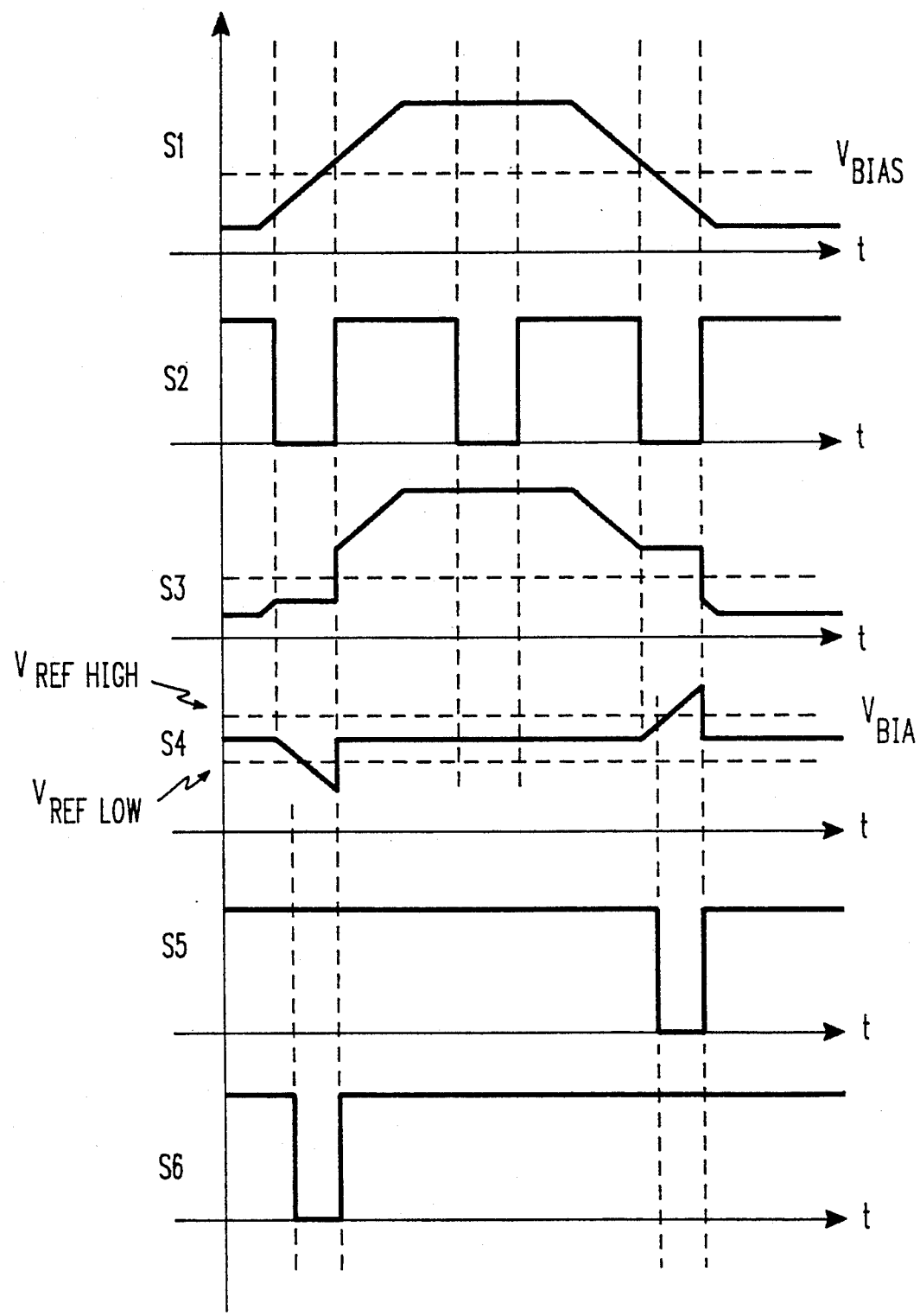
FIG. 9 is a plot of voltage versus time at different points in the circuit shown in FIG. 8.

Thus, as the clock 66 as shown in FIG. 8 changes state, inputs 92 and 76 of amplifier 78 are still sitting at the same voltage because they are basically tracking. When clock 66 changes configuration, the negative input 92 of amplifier 78 starts slewing according to the input signal. Therefore, depending on the derivative of the input signal, that is the output of the differential amplifier 40, a sawtooth type waveform is produced at point S4 in the circuit referring to FIGS. 8 and 9. The sawtooth waveform is referenced at the reference voltage. Thus, on the first phase of the sample and hold clock the sampled slope was sitting at the reference voltage. As soon as S2 switches, we see an increasing or decreasing signal according to the slope or 0 signal if the slope is 0 as shown in FIG. 9. The 0 signal means practically no change in signal from the reference voltage. Thus, this circuit samples the slope of the differential back electromotive force of the floating phases.

The output 80 of this circuit may be for example a decision circuit 96. Assuming the clock 66 now goes back to the original state, i.e., where switches 54 and 70 are closed and switch 52 is open so that the input signal is transferred to capacitor 74, the output of amplifier 78 goes back to the reference voltage since its differential input is clamped by switch 70. Then according to slope of the input signal, it will diverge positive or negative according to the slope during the other phase of the clock. The output of amplifier 78 will remain 0 if the slope is 0. This action is only performed by the decision circuit 96 after de-energizing the excitation 22 during time period T2 during the sampling period T3 to avoid sampling signals that are corrupted by long time constants or noise. As the motor 10 is moving, the output signal 80 may have a 0, positive or negative slope depending on the direction of rotation. By measuring the signal 80, both its magnitude and sign of the slope, both the direction of rotation and the amplitude of the torque of the motor may be inferred. The decision circuit 96 shown in FIG. 8 utilizes two comparators 98 and 100. The decision circuit 96 is a window comparator, basically having two thresholds which are symmetrically placed around the reference voltage, one positive and one negative with respect to the reference voltage. Assuming the reference voltage is 6 volts, the amplifier 98 might be set at a threshold of 6.2 volts and amplifier 100 might have a threshold voltage of 5.8 volts. Such a window comparator is manufactured by SGS-Thomson Microelectronics, Model No. LM393. Thus, the output signal from output 80 of amplifier 78 is such that the output at S5 of comparator 98 will trip low from high when the sample slope exceeds 6.2 volts, while the output S6 of comparator 100 will trip low when the sampled slope voltage falls below 5.8 volts. The comparators 98 and 100 are normally sitting at a high voltage and if the sampled slope does not exceed ±200 millivolts with respect to the reference voltage, the output of both comparators 98 and 100 will stay high. This condition is the condition of not having enough torque and means the slope is not large enough, therefore, the signal is not large enough. Assuming comparator 98 trips when the sampled slope exceeds 6.2 volts, this information tells us that we have sufficient torque and correct rotation of the motor to continue the excitation of the motor. If comparator 100, for example, trips low below 5.8 volts, this may be used as an indication that there is a wrong direction of rotation of the motor and the motor should not be energized. In this case, energization should be commutated to the next phase and detection of rotation should be repeated as was described for phase 20a. The circuitry to accomplish the commutation of the phases is well known and is therefore not shown.

The second aspect of the invention is directed towards a method and apparatus for commutating the phases of the brushless direct current motor 10 to maximize the torque. The motor 10 and excitation 22 is identical to that previously described. From the first aspect of the present invention, the motor 10 has now started and it is rotating in the correct direction. It is now desirable to maintain the maximum torque on the motor. This aspect of the invention entails detecting the differential back electromotive force of the non-excited phase group 26, where like numerals are used to describe like elements. The magnitude of the slope of the detected back electromotive force of the non-excited phase group 26 is then sampled and a signal representative of the magnitude of the slope is generated. The generated signal representing the magnitude of the slope is then used to increment the next commutation in the plurality of predetermined sequences upon the magnitude of the sampled slope reaching a predetermined value represented by the generated signal, whereby the maximum torque from each phase of the motor is utilized. Preferably, the method further comprises masking the generated signal for a predetermined masking time period after incrementing to the next sequence.

The improvement of this aspect of the present invention includes means 32 for detecting the differential back electromotive force in the non-excited phase group which would be identical to that used for start-up. Means 50 is provided for sampling the magnitude of the slope of the detected back electromotive force which would also be identical to the sampling means 50 previously described. As stated previously, the maximum torque from each phase of the motor is obtained if that phase is energized in opposition to its back electromotive force in the region where this is maximum. This aspect of the invention utilizes this principal to commutate the phases. This is quite an easy task at a reasonably high speed because the back electromotive force has a value which is proportional to speed. During starting, however, in ramping up of the motor speed the back electromotive force is an extremely small signal while the high acceleration of the system renders impossible the direct use of the back electromotive force signal. This aspect of the invention is applicable to both unipolar excitation and bipolar. The detection of the motor position needed to actuate the commutation is obtained by monitoring the difference or differential of the back electromotive force of the two floating phases in unipolar excitation. While in bipolar excitation, detection is done by monitoring the back electromotive force across the single floating phase.

Figure 10:
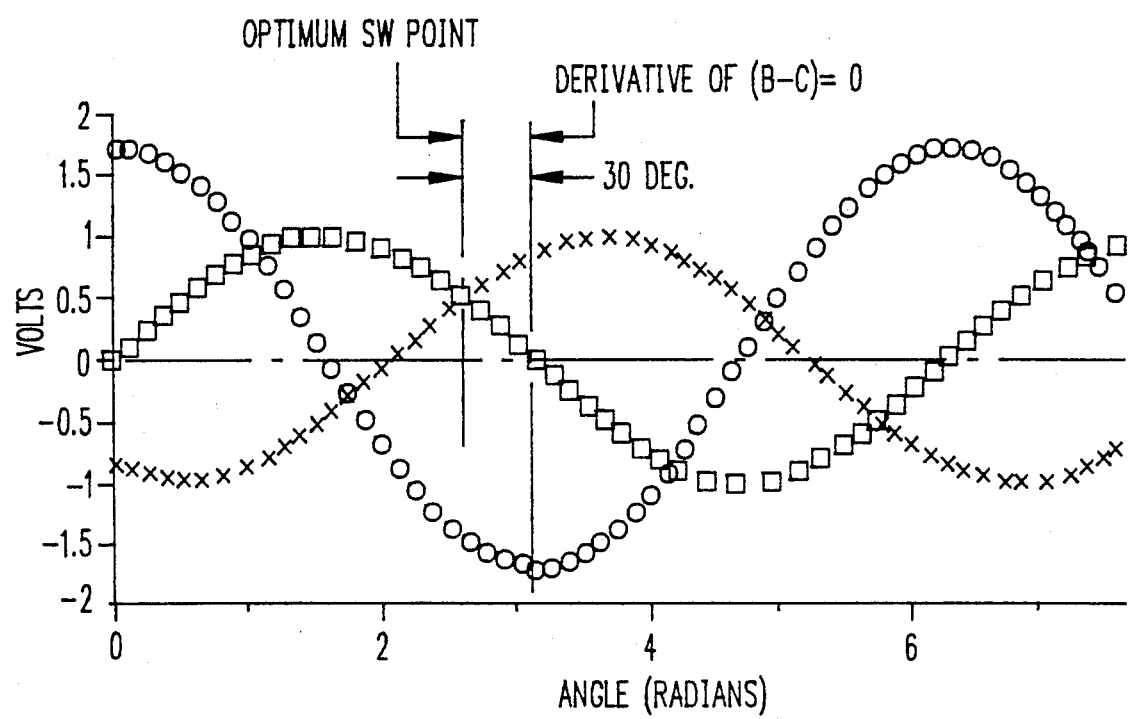
FIG. 10 is a plot showing the relationship of the predetermined value of the slope of the differential back-electromotive force of the non-excited phase group with respect to the optimum commutation point for normal operation of the motor.

It has been found that the switching or commutation condition is obtained when the derivative of the differential back electromotive force of the floating phase or phases approaches the zero value, as shown in FIG. 10. In FIG. 10, the circles indicate the differential back electromotive force V(B-C), the squares indicate the back electromotive force on phase 20a as shown in FIG. 2, and the x's indicate the back electromotive force on phase 20b in unipolar excitation for example. As can be seen from FIG. 10, the slope of V(B-C) is equal to zero about 30° from the optimum switch point or 30 electrical degrees retarded for a sinusoidal-type back electromotive force, while such condition is close to the optimum point for the case of a trapezoidal back electromotive force. A window comparator 96 as previously described centered around the reference voltage which is an equivalent zero voltage is used to detect the derivative of the back electromotive force approaching 0. By modifying such threshold, the switching point can be made close to optimum. The present invention being based on the derivative of the signals is intrinsically insensitive to offsets from the motor, the sampling multiplexer and amplifiers. Although the derivative circuit may be analog it is more conveniently obtained through a sample and hold type circuitry as shown in FIG. 8. The window comparator 96 shown in FIG. 11 may be identical to the one shown in FIG. 8. The outputs 55 and 56 of window comparator are connected in circuit with NAND gate 102 and flip flop 104. The output 56 of NAND gate 58 is connected to the clock input of flip-flop 104. The output 103 of NAND gate 102 is connected to the D input of flip-flop 104. The $\bar{Q}$ output of flip-flop 104 gives the X input to AND gate 106. Preferably, this aspect of the invention further includes masking means 108 includes monostable flip flop 110 and AND gate 106 shown in FIG. 11. The output Y of the AND gate 106 is connected to the clock input of the sequencer 21 which increments the commutations to the next phase. Upon a signal at the Y output causing a commutation, it also causes monostable flip flop 110 to go low at output Q for masking period time T5 which prevents any unwanted signals at the X input of NAND gate 106 from causing an unwanted commutation immediately after commutation has been made. The masking time T5 can be two milliseconds or less.

Figure 11:
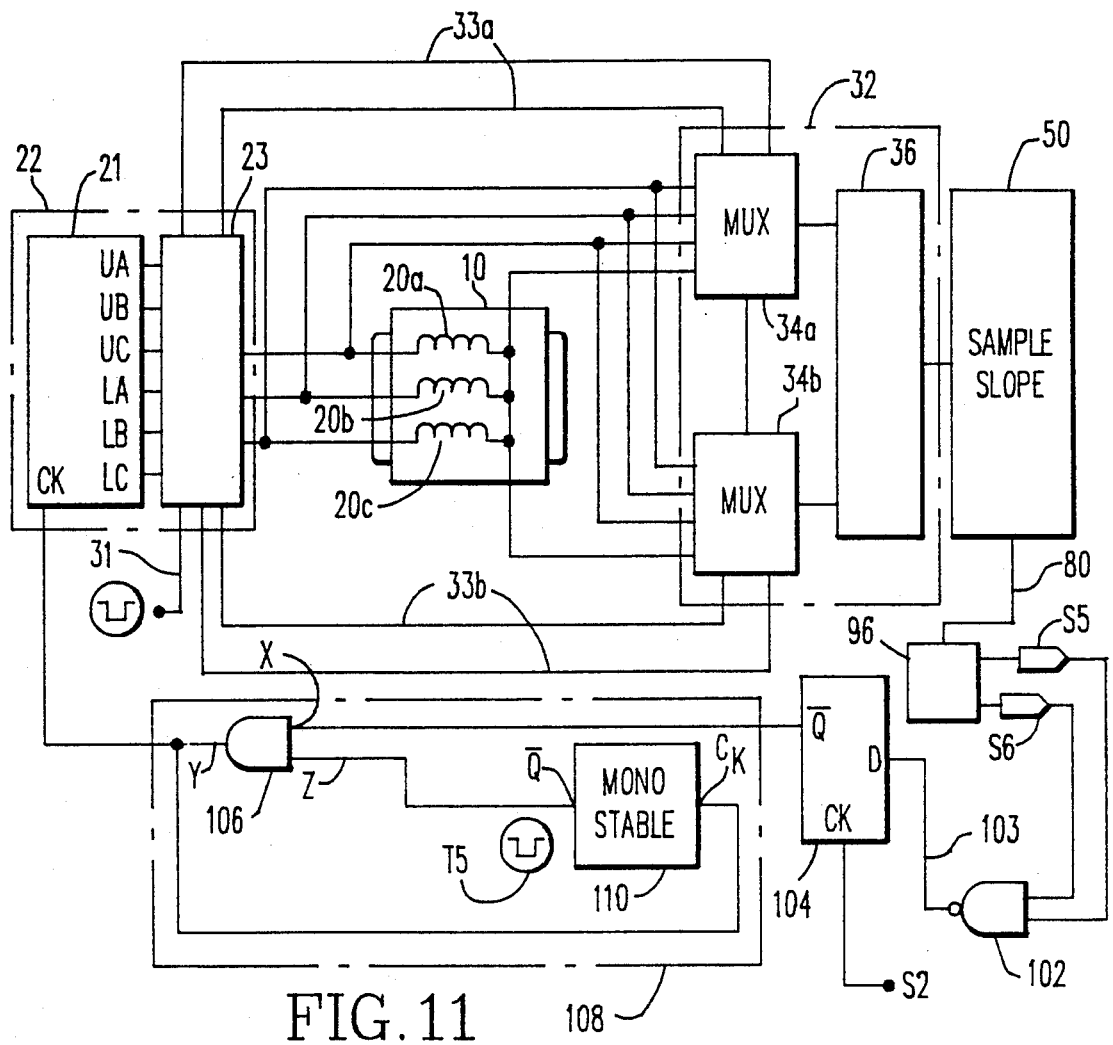
FIG. 11 shows a preferred arrangement of the present invention for sampling the slope of the back-electromotive force of the non-excited phase group and incrementing the excitation means upon the proper value of the magnitude of the slope being detected.
Figure 12:
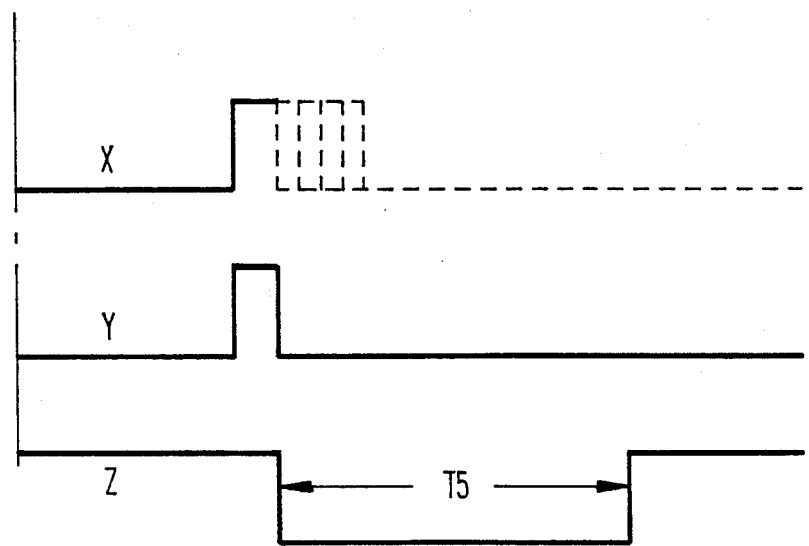
FIG. 12 is a chart showing the relationship of the signals "X", "Y" and "Z" shown in FIG. 11 with respect to time.

The following is a table of components for the circuits shown in FIGS. 8 and 11.

| TABLE OF COMPONENTS | | | |
|---|---|---|---|
| COMPONENT | MANUFACTURER | MODEL | VALUE |
| MOTOR (10) | NIDEC | 2527-42FX-01 | |
| SEQUENCER (21) | SGS-Thomson | HCC 4013B | |
| FLIP-FLOP (104) | SGS-Thomson | HCC 4013B | |
| EXCITER (23) | SGS-Thomson | L6232 | |
| MULTIPLEXERS (34) | SGS-Thomson | HCC 4052B | |
| SWITCHES (52, etc.) | SGS-Thomson | HCC 4016B | |
| MONOSTABLE (110) | SGS-Thomson | HCC 4098B | |
| NAND GATES (58, 102) | SGS-Thomson | HCC 4011B | |
| AND GATES (106) | SGS-Thomson | HCC 4081B | |
| OP AMPS (38, 78, 74, 40) | SGS-Thomson | LM 358AN | |
| COMPARATORS (98, 100) | SGS-Thomson | LM 393N | |
| CAPACITOR (72) | | | 39 nF |
| RESISTORS (42, 43) | | | 10 kΩ |
| RESISTORS (46, 48) | | | 39 KΩ |
| RESISTORS (84, 87) | | | 10 KΩ |
| RESISTORS (82, 86) | | | 100 KΩ |

We claim:

1. In combination with a sensorless brushless direct current motor, said motor including a permanent magnet rotor, a stator having multiple phases, excitation means for sequentially in a plurality of predetermined commutations exciting simultaneously a predetermined number of said multiple phases while maintaining the remainder of said multiple phases in a non-excited state such that during each of said commutations said sequential excitation of said multiple phases, said simultaneously excited phases constitute an excited phase group and said remainder of said multiple phases constitute a non-excited phase group, the improvement which comprises:

a. means for turning off said excitation to said excited phase group at a predetermined time during start-up of said motor for a predetermined off-time period such that none of said multiple phases are excited during said off-time period;

b. means for detecting the differential back electromotive force developed in said non-excited phase group during said predetermined off-time period;

c. means for sampling the magnitude and sign of the slope of said detected back electromotive force of said non-excited phase group for a predetermined sample period during said off-time period, whereby the direction of rotation and torque on said rotor may be determined during start-up.

2. The combination of claim 1, wherein said multiple phases of said stator consist of three phases connected in Y-configuration.

3. The combination of claim 2, wherein said excited phase group consists of one of said three phases and said non-excited phase group consists of the remaining two of said three phases.

4. The combination of claim 2, wherein said excited phase group consists of two of said three phases and said non-excited phase group consists of the remaining one of said three phases.

5. The combination of claim 3, wherein said predetermined sample period begins after a predetermined delay period, said delay period starts at the beginning of said off-time period, whereby noise from unwanted signals generated during start-up are diminished before said sampling period is started.

6. The combination of claim 4, wherein said predetermined sample period begins after a predetermined delay period which begins at the beginning of said off-time period, whereby noise from unwanted signals are diminished before said sampling period is started.

7. The method of detecting the direction of rotation and torque on a rotor of a sensorless brushless direct current motor during start-up, said motor including a permanent magnet rotor, a stator having multiple phases, excitation means for sequentially in a plurality of predetermined commutations exciting simultaneously a predetermined number of said multiple phases while maintaining the remainder of said multiple phases in a non-excited state such that during each of said commutations of said sequential excitation of said multiple phases, said simultaneously excited phases constitute an excited phase group and said remainder of said multiple phases constitute a non-excited phase group, said method comprising:

a. turning off the excitation to said excited phase group at a predetermined time during start-up of said motor such that none of said phases are excited during said off-time period;

b. detecting the differential back-electromotive force developed in the two non-excited phases during said predetermined off-time period;

c. sampling the magnitude and sign of the slope of said detected differential back electromotive force for a predetermined sample period during said off-time period whereby the direction of rotation and torque on said rotor may be determined.

8. The method of claim 7, wherein said multiple phases of said stator consist of three phases connected in Y-configuration.

9. The method of claim 8, wherein said excited phase group consists of one of said three phases and said non-excited phase group consists of the remaining two of said three phases.

10. The method of claim 8, wherein said excited phase group consists of two of said three phases and said non-exited phase group consists of the remaining one of said three phases.

11. The method of claim 9, wherein said sample period begins after a predetermined delay period, said delay period starts at the beginning of said off-time period, whereby noise from unwanted signals generated during start-up are diminished before said sampling period is started.

12. The method of claim 10, wherein said sample period begins after a predetermined delay period, said delay period starts at the beginning of said off-time period, whereby unwanted signals generated during start-up are diminished before said sampling period is started.

13. In combination with a sensorless brushless direct current motor, said motor including a permanent magnet rotor, a stator having multiple phases, excitation mean for sequentially in a plurality of predetermined commutations exciting simultaneously a predetermined number of said multiple phases while maintaining the remainder of said multiple phases in a non-excited state such that during each of said sequences of said sequential excitation of said multiple phase said simultaneously excited phases constitute an excited phase group and said remainder of said multiple phases constitute a non-excited phase group, the improvement which comprises:

a. means for detecting the differential back electromotive force in said non-excited phase group;

b. means for sampling the magnitude of the slope of said detected back electromotive force of said non-excited phase group, and for generating a signal representative of said magnitude of said slope;

c. means for causing said excitation means to increment to the next commutation in said plurality of predetermined sequences upon said magnitude of said sampled slope reaching a predetermined value represented by said generated signal, whereby the maximum torque from each phase of said motor is utilized.

14. The combination of claim 13, in which the improvement further comprises means for masking said generated signal for a predetermined masking time period upon said excitation means incrementing to the next commutation, whereby said excitation means is prevented from incrementing for a predetermined time after switching to the next commutation.

15. The combination of claim 14, wherein said multiple phases of said stator consist of three phases connected in Y-configuration.

16. The combination of claim 15, wherein said excited phase group consists of one of said three phases and said non-excited phase group consists of the remaining two of said three phases.

17. The combination of claim 15, wherein said excited phase group consist of two of said three phases and said non-excited phase consists of the remaining one of said three phases.

18. The method of commutating the phases of a sensorless brushless direct current motor to maximize the torque, said motor including a permanent magnet rotor, a stator having multiple phases, excitation means for sequentially in a plurality of predetermined sequences exciting simultaneously a predetermined number of said multiple phases while maintaining the remainder of said multiple phases in a non-excited state such that during each of said sequences of said sequential excitation of said multiple phases, said simultaneously excited phases constitute an excited phase group and said remainder of said multiple phases constitute a non-excited phase group, said method comprising:

a. detecting the differential back electromotive force in said non-excited group;

b. sampling the magnitude of the slope of said detected back electromotive force of said non-excited phase group and generating a signal representative of said magnitude of said slope;

c. incrementing to the next commutation in said plurality of predetermined sequences upon said magnitude of said sampled slope reaching a predetermined value represented by said generated signal, whereby the maximum torque from each phase of said motor is utilized.

19. The method of claim 18, wherein said improvement further comprises masking said generated signal for a predetermined masking time period after incrementing to said next sequence.

20. The method of claim 18, wherein said multiple phases of said stator consists of three phases connected in Y-configuration.

21. The method of claim 20, wherein said excited phase group consists of one of said three phases and said non-excited phase group consists of the remaining two of said three phases.

22. The method of claim 20, wherein said excited phase group consists of two of said three phases and said non-excited phase group consists of the remaining one of said three phases.

* * * * *